(12) United States Patent
Kreher et al.

(10) Patent No.: US 7,392,639 B2
(45) Date of Patent: Jul. 1, 2008

(54) CARTON TOP SEALER APPARATUS AND METHOD

(75) Inventors: Cletus Emerich Kreher, Marion, IA (US); George Allen Morden, Coralville, IA (US)

(73) Assignee: Evergreen Packaging Inc., Memphis, TN (US)

( * ) Notice: Subject to any disclaimer, the term of this patent is extended or adjusted under 35 U.S.C. 154(b) by 95 days.

(21) Appl. No.: 11/302,841

(22) Filed: Dec. 14, 2005

(65) Prior Publication Data

US 2007/0130892 A1   Jun. 14, 2007

(51) Int. Cl.
*B65B 51/30* (2006.01)
(52) U.S. Cl. .................. 53/479; 53/374.8; 53/374.9
(58) Field of Classification Search ............ 53/371.9, 53/374.9
See application file for complete search history.

(56) References Cited

U.S. PATENT DOCUMENTS

| | | | | |
|---|---|---|---|---|
| 2,889,673 A | * | 6/1959 | Rockland et al. | 53/512 |
| 3,063,890 A | * | 11/1962 | Saumsiegle | 156/308.4 |
| 3,319,398 A | * | 5/1967 | Vadas et al. | 53/370.6 |
| 3,449,887 A | * | 6/1969 | Abramson | 53/76 |
| 3,461,645 A | * | 8/1969 | Snyder | 53/512 |
| 3,648,429 A | * | 3/1972 | Davidson et al. | 53/77 |
| 4,136,502 A | | 1/1979 | Shore | |
| 4,650,535 A | * | 3/1987 | Bennett et al. | 156/352 |
| 5,286,327 A | | 2/1994 | Swartz | |
| 6,430,899 B1 | | 8/2002 | Cicha | |

FOREIGN PATENT DOCUMENTS

EP    1522398    4/2005
FR    94692      10/1969

* cited by examiner

*Primary Examiner*—John Sipos
(74) *Attorney, Agent, or Firm*—Daniel F. Nesbitt; Donald E. Hasse; Hasse & Nesbitt LLC

(57) ABSTRACT

A method for forming a top seal on a carton being conveyed along a processing path on a form, fill and seal packaging machine using a top sealer including opposing sealing jaws is provided. The carton includes top fin panels configured for sealing to one another to form a top seal. The method includes actuating a first control valve to provide communication between a first pressurized fluid source and a first port of an actuator for moving the actuator toward a first position. The actuator is operatively connected to the sealing jaws to move the sealing jaws in a clamping direction while moving toward the first position. A second control valve is actuated to inhibit fluid escape from the actuator through a second port of the actuator to inhibit movement of the sealing jaws in the clamping direction.

24 Claims, 9 Drawing Sheets

CARTON TOP SEALER APPARATUS AND METHOD

TECHNICAL FIELD

The present application relates generally to carton filling apparatus and more particularly to a carton top sealer apparatus and associated method.

BACKGROUND

Conventional paperboard cartons for liquid food products are commonly constructed from paperboard sheets coated with a film of a heat sealable, waterproof thermoplastic material such as polyethylene, polyvinyl chloride or polypropylene. When heated, this plastic film becomes tacky, so that sheets thus coated and heated can be sealed together by being squeezed tightly together. The coated sheets are initially cut into flat carton blanks. These blanks are subsequently folded into a generally rectangular open-ended configuration, then are closed at one end by forming a bottom end wall via folding and sealing bottom end closure panels which extend integrally from the four side walls of the carton blank. The cartons can then be filled and sealed with a gabled or flat-folded top.

Automated carton filling apparatus are frequently used to automatically form, fill and seal cartons. Automated mechanical systems (e.g., a top sealer and a bottom sealer) are frequently utilized to fold and/or seal the tops and/or bottoms of the cartons. Due to the rates of speed of production, such systems can be noisy. Pneumatically driven systems have been proposed to reduce noise during operation.

SUMMARY

In an aspect, a method for forming a top seal on a carton being conveyed along a processing path on a form, fill and seal packaging machine using a top sealer including opposing sealing jaws is provided. The carton includes top fin panels configured for sealing to one another to form a top seal. The method includes actuating a first control valve to provide communication between a first pressurized fluid source and a first port of an actuator for moving the actuator toward a first position. The actuator is operatively connected to the sealing jaws to move the sealing jaws in a clamping direction while moving toward the first position. A second control valve is actuated to inhibit fluid escape from the actuator through a second port of the actuator to inhibit movement of the sealing jaws in the clamping direction.

In another aspect, in a carton filling apparatus, a system for forming a top seal on a carton being conveyed along a processing path of the carton filling apparatus is provided. The system includes a top sealer including opposing sealing jaws and control system including an actuator operatively connected to the sealing jaws for opening and closing the sealing jaws to receive and seal the carton. The control system further includes a first pressurized fluid source that delivers pressurized fluid to the actuator, a first control valve that controls delivery of pressurized fluid to the actuator from the first pressurized fluid source and a second control valve that controls escape of pressurized fluid from the actuator. The control system actuates the first control valve to provide communication between the first pressurized fluid source and a first port of the actuator for moving the actuator toward a first position. The actuator is operatively connected to the sealing jaws to move the sealing jaws in a clamping direction while moving toward the first position. The second control valve is actuated by the control system to inhibit fluid escape from the actuator through a second port of the actuator to inhibit movement of the sealing jaws in the clamping direction.

The details of one or more embodiments of the invention are set forth in the accompanying drawings and the description below. Other features, objects, and advantages of the invention will be apparent from the description and the drawings, and from the claims.

DETAILED DESCRIPTION

Figure 1:
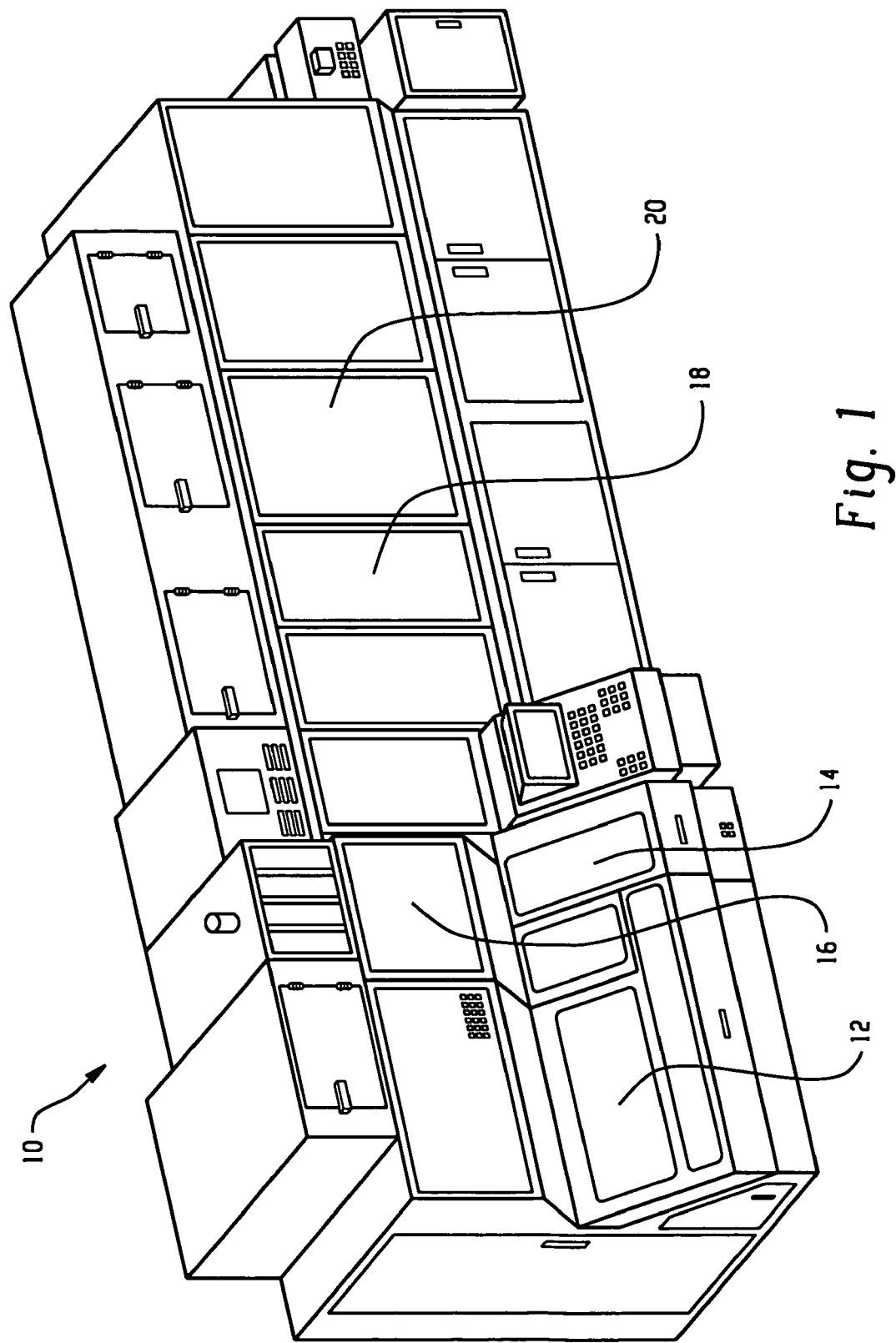
FIG. 1 is a perspective view of an embodiment of a carton filling apparatus.

Referring to FIG. 1, a container filling apparatus 10 sometimes referred to as a form, fill and seal packaging machine includes a carton magazine 12 for storing flat carton blanks, a carton preassembly station 14 and a bottom forming and sealing station 16. The apparatus 10 may also include air filtering features for filtering contaminants such as dust particles from regions of the apparatus through which the cartons travel. The apparatus 10 further includes a filling station 18 that is used to fill cartons subsequent to their preassembly at station 14 and bottom forming and sealing at station 16. Top panels of the cartons are folded and sealed at a top sealing station 20.

Figure 2:
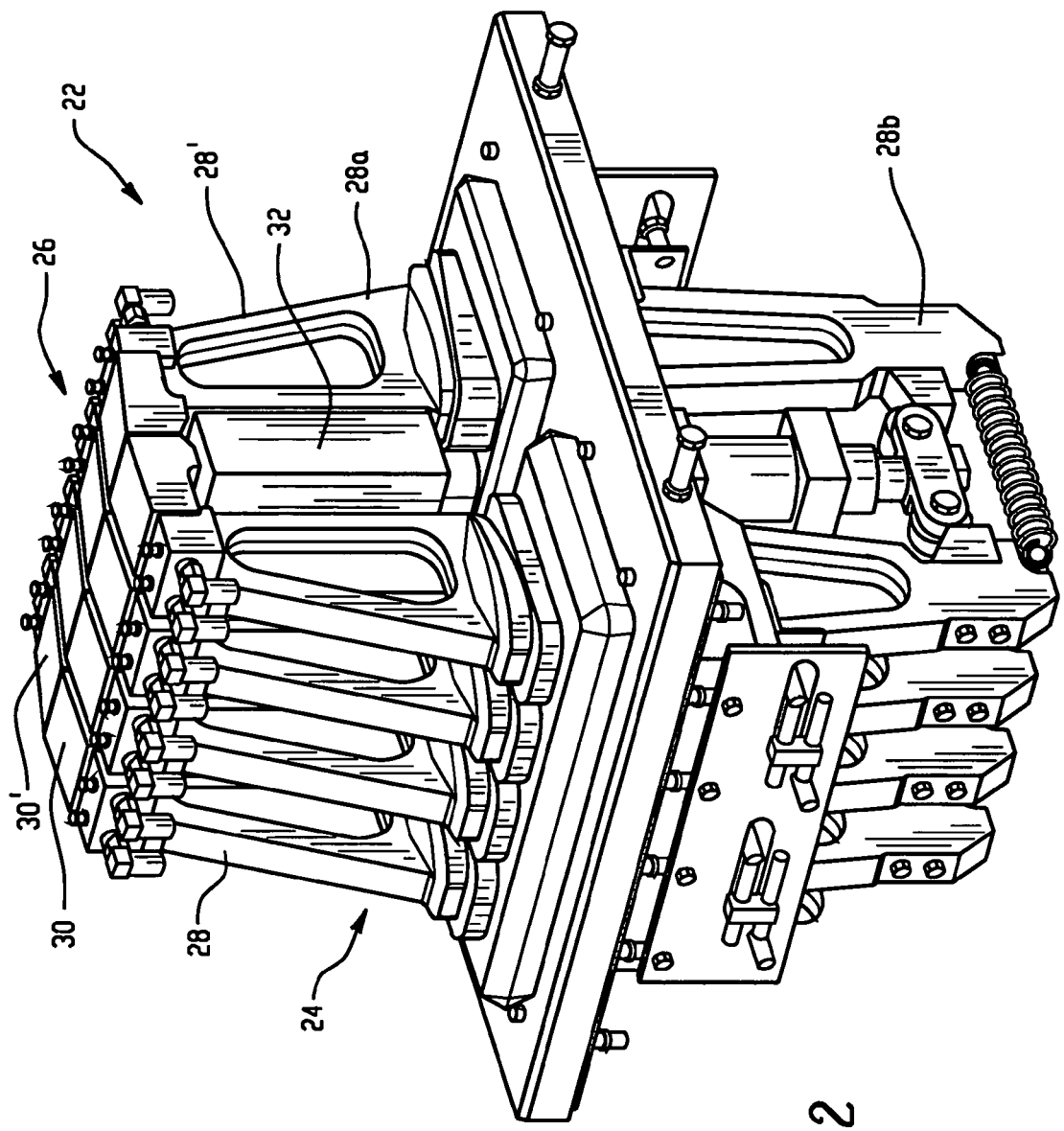
FIG. 2 is a perspective view of an embodiment of a top sealer apparatus for use in the carton filling apparatus of FIG. 1.

FIG. 2 shows an isolated view of a top sealer 22 embodiment. Top sealer 22 includes opposing sets 24 and 26 of arms 28 and 28' with each arm including an upper arm 28a that is connected to a lower arm 28b. Sealing jaw members 30 and 30' are carried by the upper arms 28a. The sealing jaws 30 of set 24 oppose the sealing jaws 30' of set 26 so that, when closed or in a clamping position, the sealing jaws press against the carton 32 tops to tightly squeeze the cartons for sealing the carton flaps.

Figure 3:
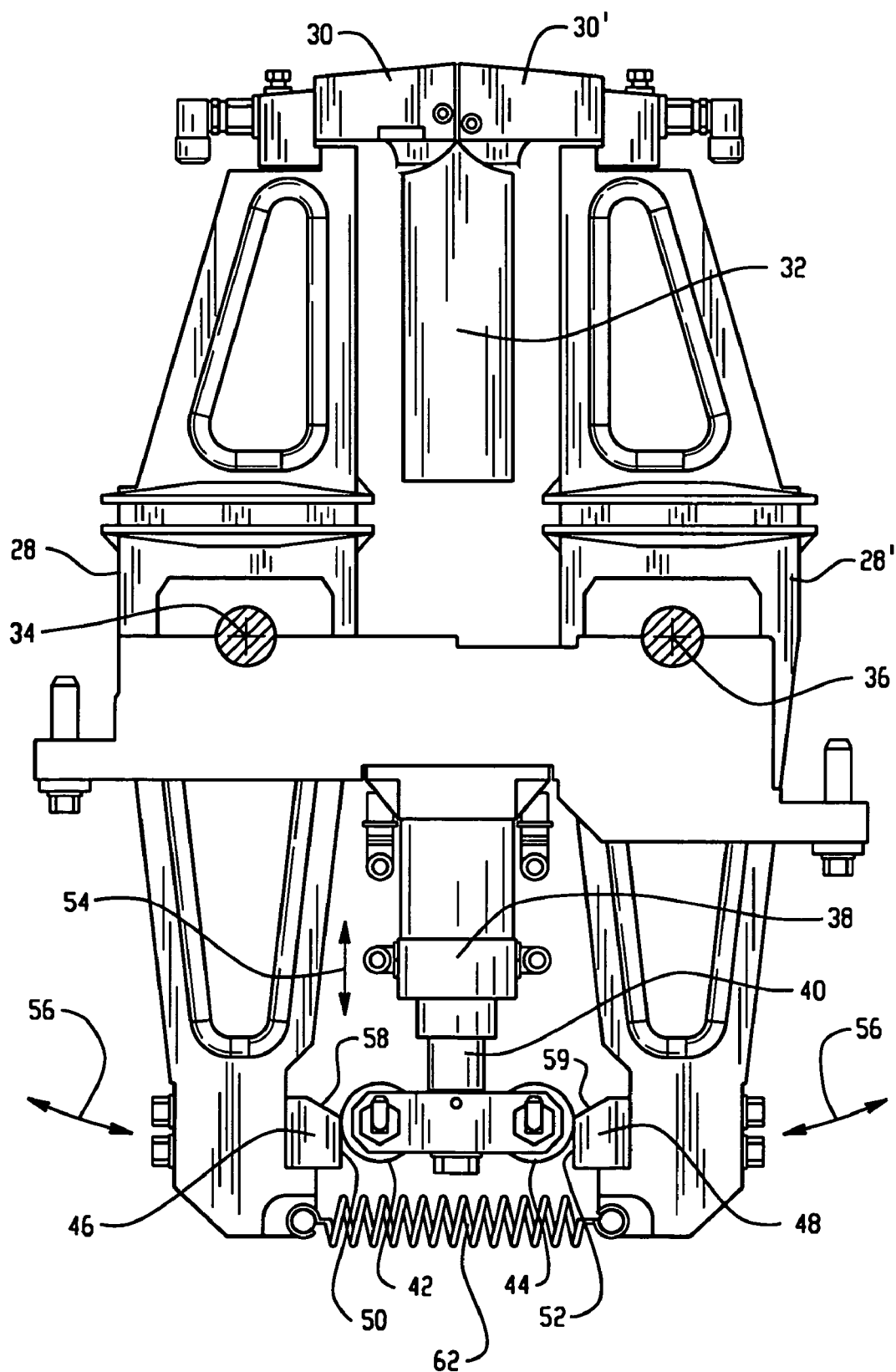
FIG. 3 is a side view of an embodiment of a top sealer apparatus similar to that of FIG. 2 illustrating arm pivots.

Referring to FIG. 3, arms 28, 28' are pivotable about respective arm pivots 34 and 36. Pivoting of the arms 28, 28' about their respective pivots 34, 36 allow the arms to open and close to receive and seal cartons 32 as the cartons travel along a carton path. Arm 28, 28' movement is controlled by a control system that includes an actuator (e.g., a linear or rotary actuator), in this example, a pneumatic, dual action cylinder 38. Cylinder 38 includes an output rod 40 that is connected to a pair of rollers 42, 44 displaced horizontally (or radially) from the rod. The rollers 42, 44 are in contact with respective displacement members 46 and 48, each having a rolling surface 50, 52 along which the rollers travel. The rollers 42, 44 and displacement members 46, 48 are used to convert movement of rod 40 in the direction of arrow 54 into pivoting movement of the arms 28, 28' about pivot points 34, 36 as reflected by arrows 56. Other coupling arrangements may be utilized.

As can be appreciated from FIG. 3, retraction (e.g., upward movement) of the cylinder rod 40 causes the rollers 42, 44 to travel along angled portions 58, 59 of the displacement members 46, 48, which allows the lower arms 28b to travel toward each other (e.g., due to biasing member 62 such as a spring that biases ends of the lower arms 28b toward each other). In response, sealing jaws 30, 30' move apart or open. Extension (e.g., downward movement) of the cylinder rod 40 forces the lower arms 28b away from one another, which causes the upper arms 28a and sealing jaws 30, 30' to move toward one another in a clamping motion. Other arrangements are contemplated. For example, the displacement members 46, 48 may be shaped and arranged such that retraction of the cylinder rod 40 causes the upper arms 28a and sealing jaws 30, 30' to move toward one another in a clamping motion and extension of the cylinder rod 40 causes the upper arms to move away from each other toward an open position.

Figure 4:
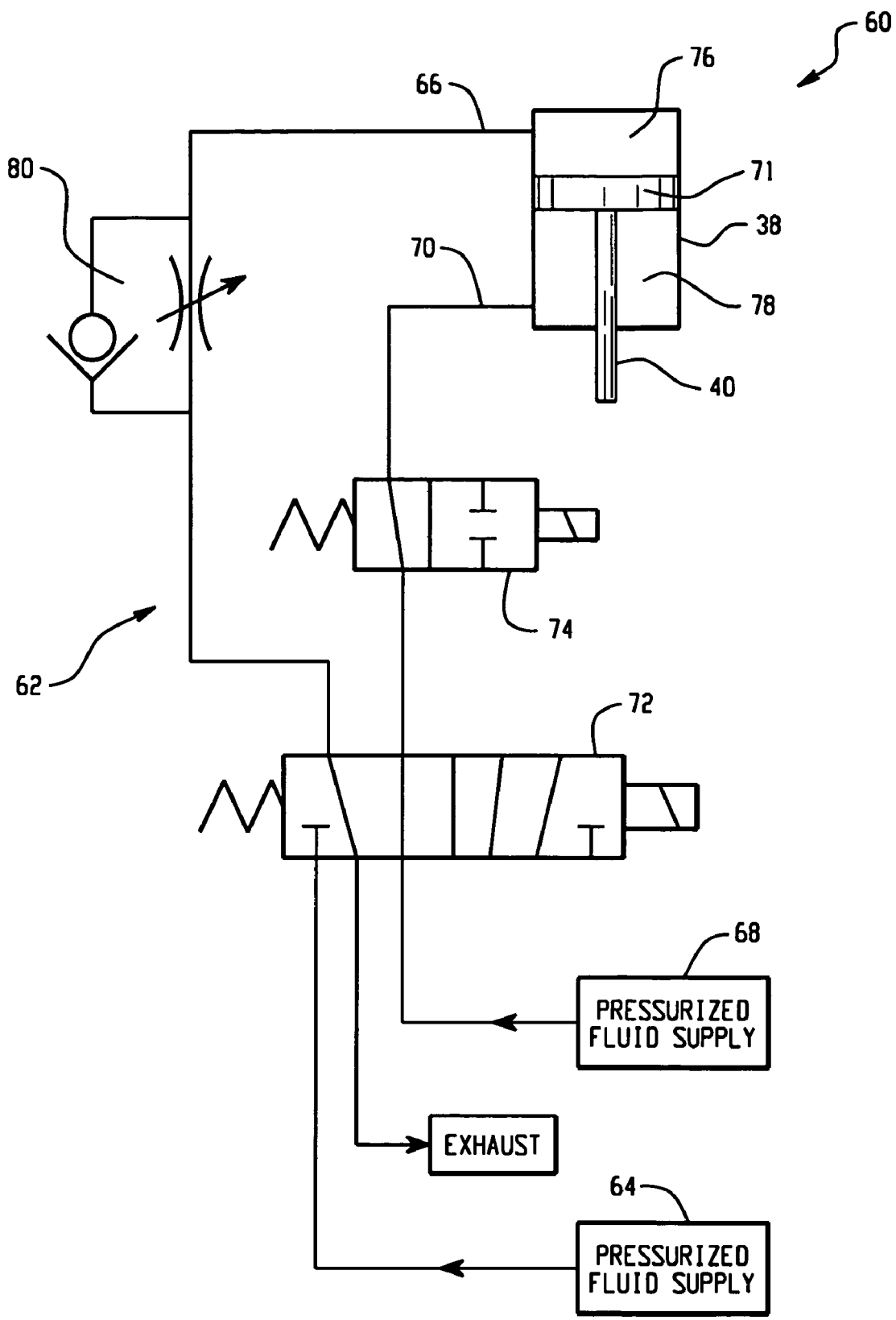
FIG. 4 is a schematic illustration of an embodiment of a control system for use in controlling actuation of the top sealer of FIG. 3.

Referring to FIG. 4, control system 60 includes a control valve circuit 62 for use in controlling extension and retraction of the cylinder 38. Control system 60 includes a first pressurized fluid supply 64 capable of communicating with cylinder 38 through an extend port 66 and a second pressurized fluid supply 68 capable of communicating with the cylinder through a retract port 70. Extend port 66 is in communication with an extend chamber 76 of the cylinder 38 (at one side of piston 71) and retract port 70 is in communication with a retract chamber 78 of the cylinder (at the opposite side of piston 71). First and second control valves 72 and 74 control delivery and escape of pressurized fluid to and from the cylinder 38. A flow control valve 80 provides for restricted exhausting of pressurized fluid from extend chamber 76 through the extend port 66. Flow control valve 80 includes a check valve allowing unrestricted fluid flow to the extend port 66 and a restriction (e.g., a needle valve) that can restrict fluid flow from the extend port.

Figure 5A:
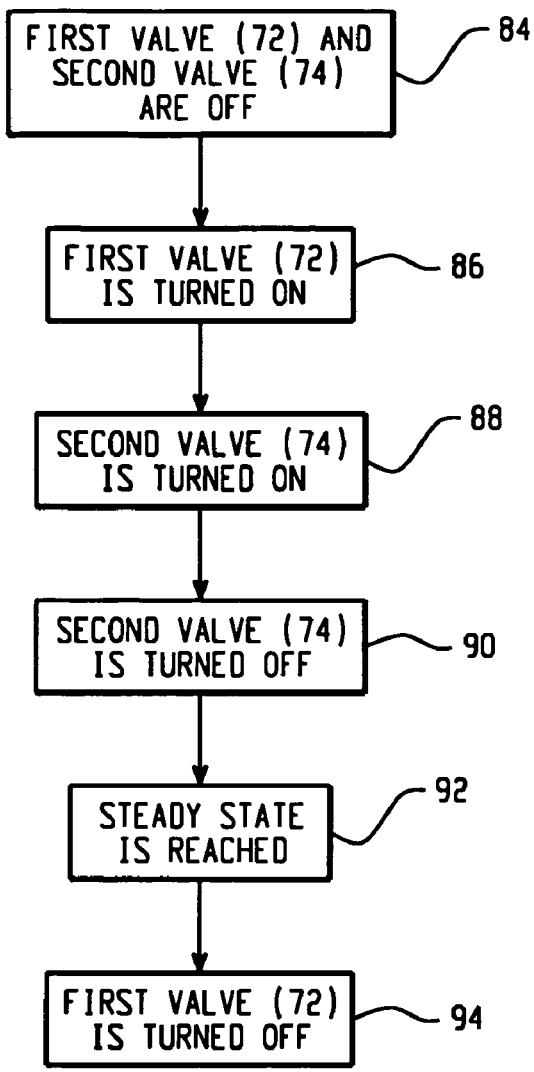
FIG. 5A is an embodiment of a process of controlling actuation of the top sealer of FIG. 3.
Figure 5B:
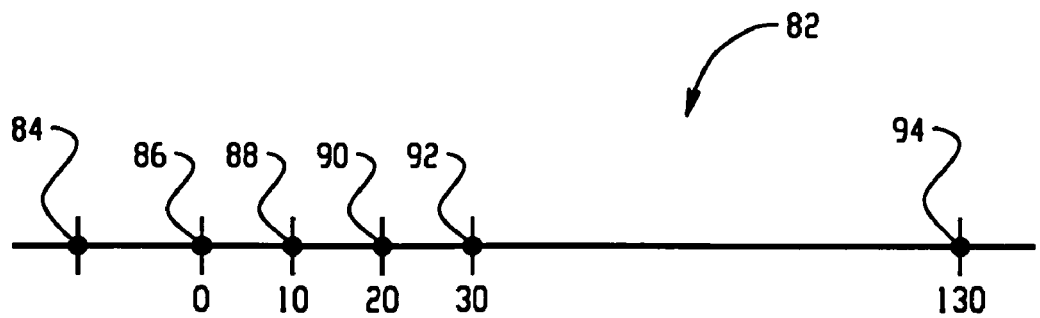
FIG. 5B is an embodiment of a timeline.

Second control valve 74 is used in creating an air cushion to prevent the sealing jaws 30, 30' from impacting at relatively high speed. FIGS. 5A and 5B illustrate an exemplary control process for use in controlling extension and retraction of the cylinder 38. In the timeline 82 example of FIG. 5B, one degree is approximately 2.5 milliseconds and the cycle repeats every 360 degrees. Approximate conveyor dwell is 0-130 degrees. However, the timing may change depending on, for example, processing and system requirements.

Figure 6A:
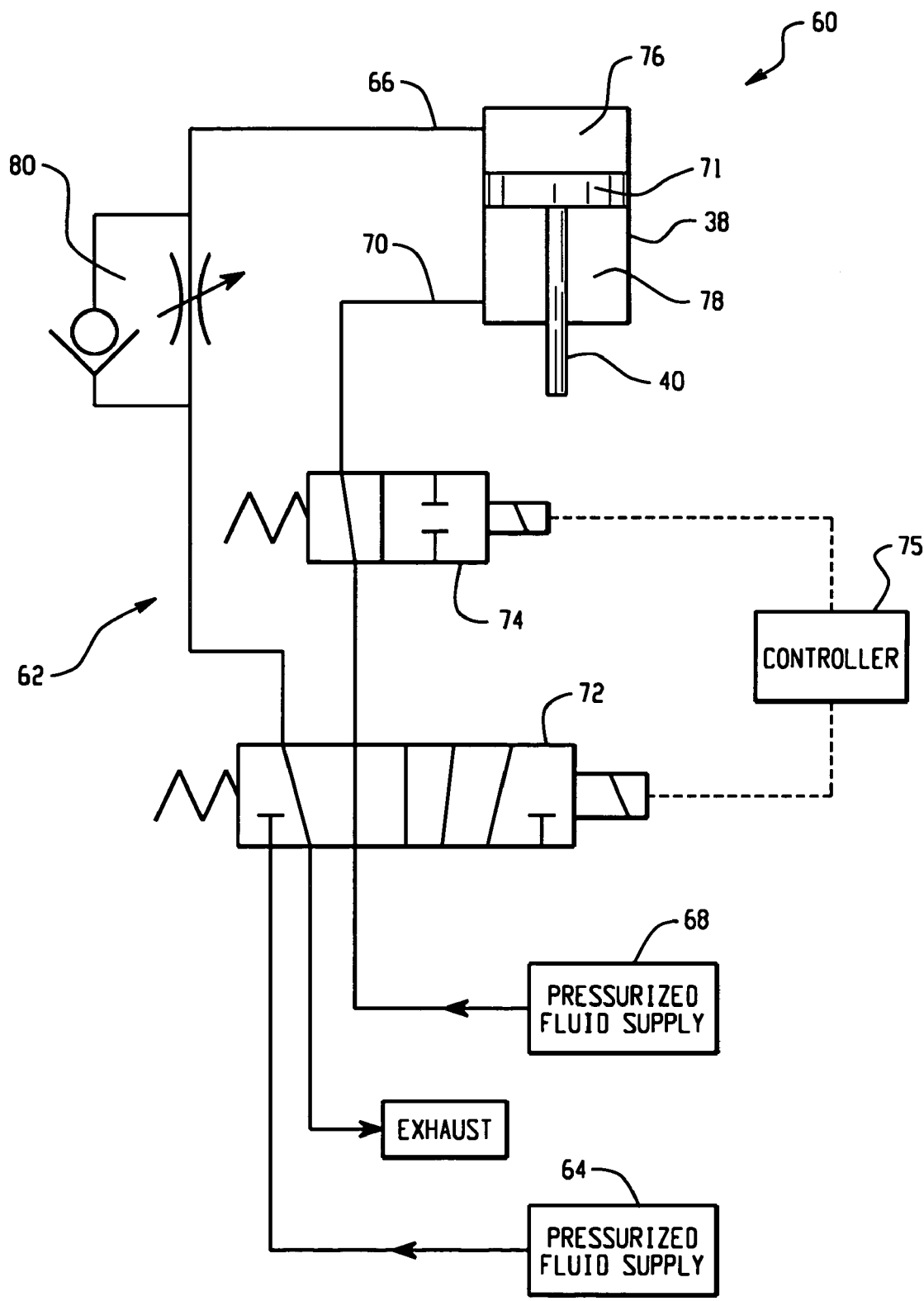
FIGS. 6A-6C illustrate the control system of FIG. 4 in various stages of use.
Figure 6B:
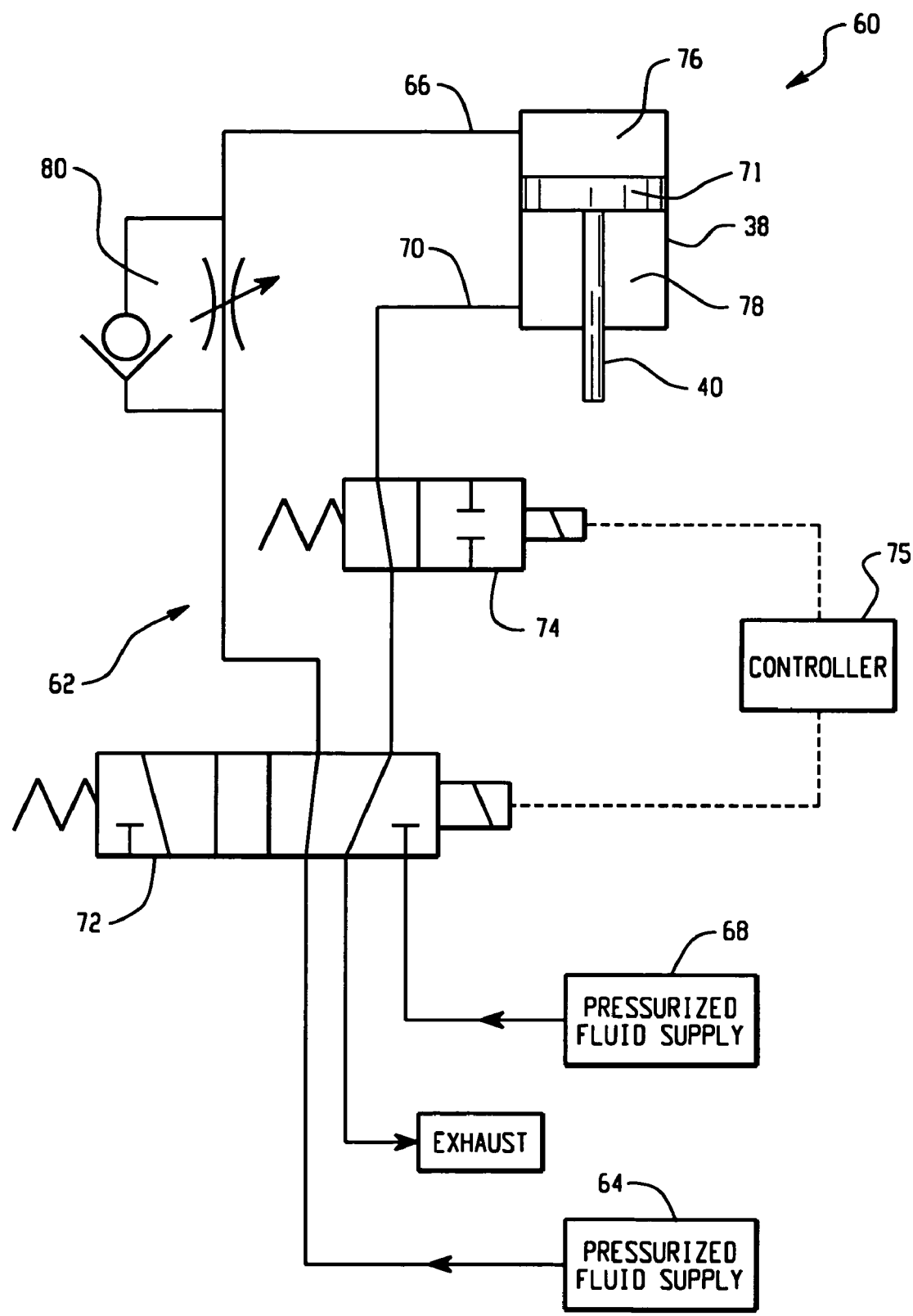
Figure 6C:
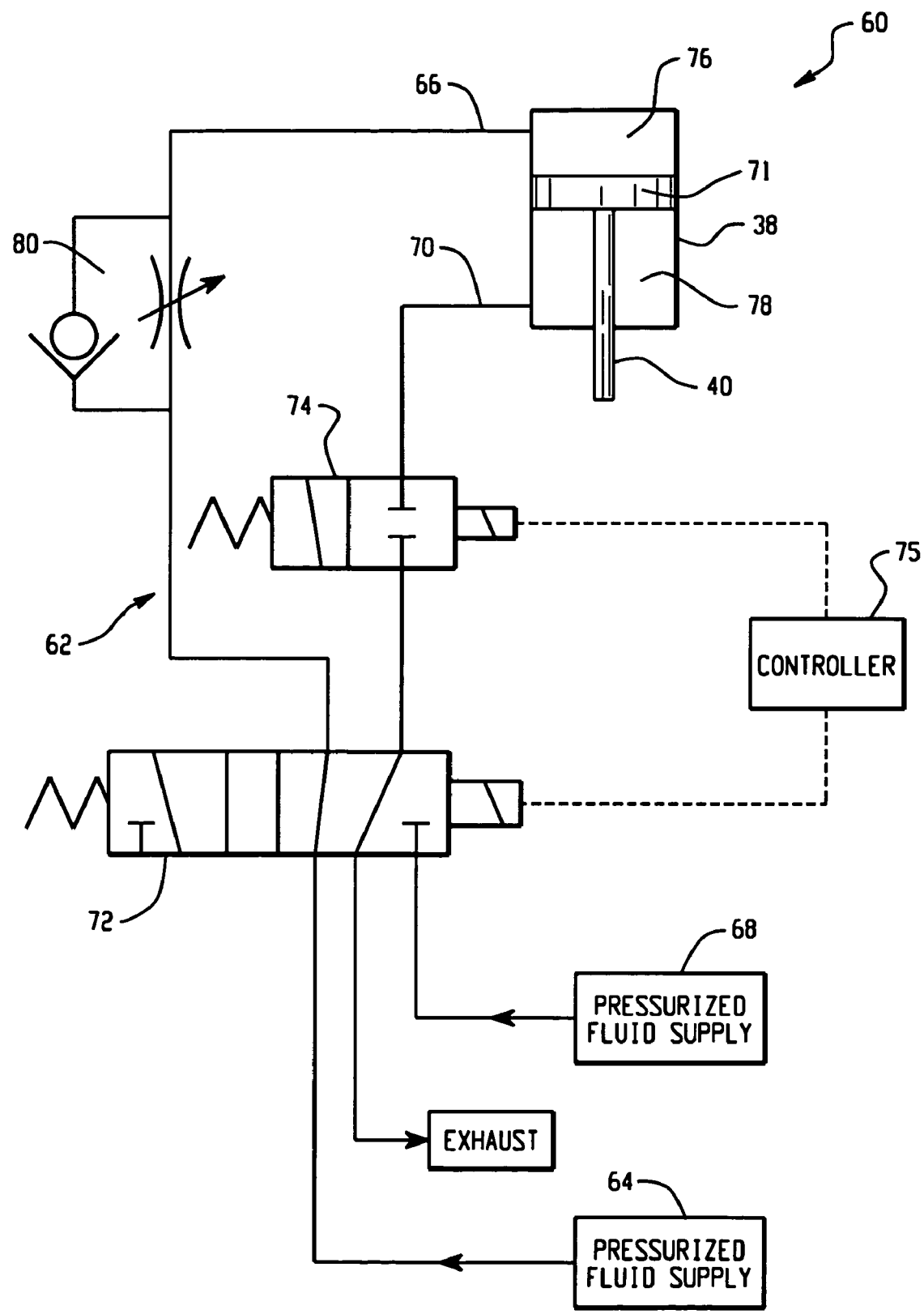

At step 84, both of the first and second valves 72 and 74 are in their OFF positions as shown by FIG. 6A. With the first and second valves 72, 74 in these positions, no pressurized fluid is delivered through the extend port 66 to the extend chamber 76 while the retract chamber 78 is pressurized (e.g., at 40 psi) using the second pressurized fluid supply 68 which fully retracts the rod 40 and sealing jaws 30 (i.e., the sealing jaws are in their open positions). At step 86, the first control valve 72 is actuated (e.g., by a controller 75) and turned ON with the second control valve 74 remaining OFF as shown by FIG. 6B. With the first control valve 72 in this position, pressurized fluid at a higher pressure than that delivered by the second pressurized fluid supply 68 is delivered by the first pressurized fluid supply 64 to port 66 into the extend chamber 76. Because the cylinder 38 is allowed to exhaust through the retract port 70, the rod 40 begins to extend. At approximately ten degrees after step 86, the second control valve 74 is actuated and turned ON at step 88 as shown by FIG. 6C. With the second control valve 74 ON, fluid can no longer escape from the retract chamber 78 through the retract port 70. As the cylinder 38 extends, pressure builds in the retract chamber 78. When the cylinder 38 extends an amount that is less than the fully extended position (e.g., about 90 percent of its stroke), the pressure in the retract chamber 78 increases to an amount about equal to the pressure in the extend chamber, causing the rod 40 to slow down substantially (in some embodiments, stop) extending prior to reaching its fully extended position.

Approximately ten degrees after step 88, the second control valve 74 is actuated and turned OFF at step 90 as shown by FIG. 6B. With the second control valve 74 OFF, trapped fluid in retract chamber 78 is again allowed to escape through the retract port 70. Pressurized fluid continues flowing from the first pressurized fluid supply 64, through the extend port 66 and into the extend chamber 76 causing the cylinder 38 to extend to its fully extended position which causes the sealing jaws 30 to move to their clamped position. The final movement of the sealing jaws 30 is slower than if movement of the sealing jaws were not slowed or stopped at step 88, which reduces noise produced by the clamping of the sealing jaws. At step 92, steady-state is reached with substantially no fluid in the retract chamber 78 and the extend chamber 76 fully pressurized. At step 92, full squeezing force (e.g., about 2000 lbs) is applied to seal the carton top. At this step, the top sealer may also be used to cool the carton top. At step 94, the first control valve 72 is actuated and turned OFF as shown by FIG. 6A so that pressure drops at a moderate rate due to the restriction of flow control valve 80. Pressurized fluid is delivered from the second pressurized fluid supply 68 to the retract chamber 78 and the cylinder 38 retracts at moderate speed due to the restricted escape of fluid from the extend port 66.

Figure 7:
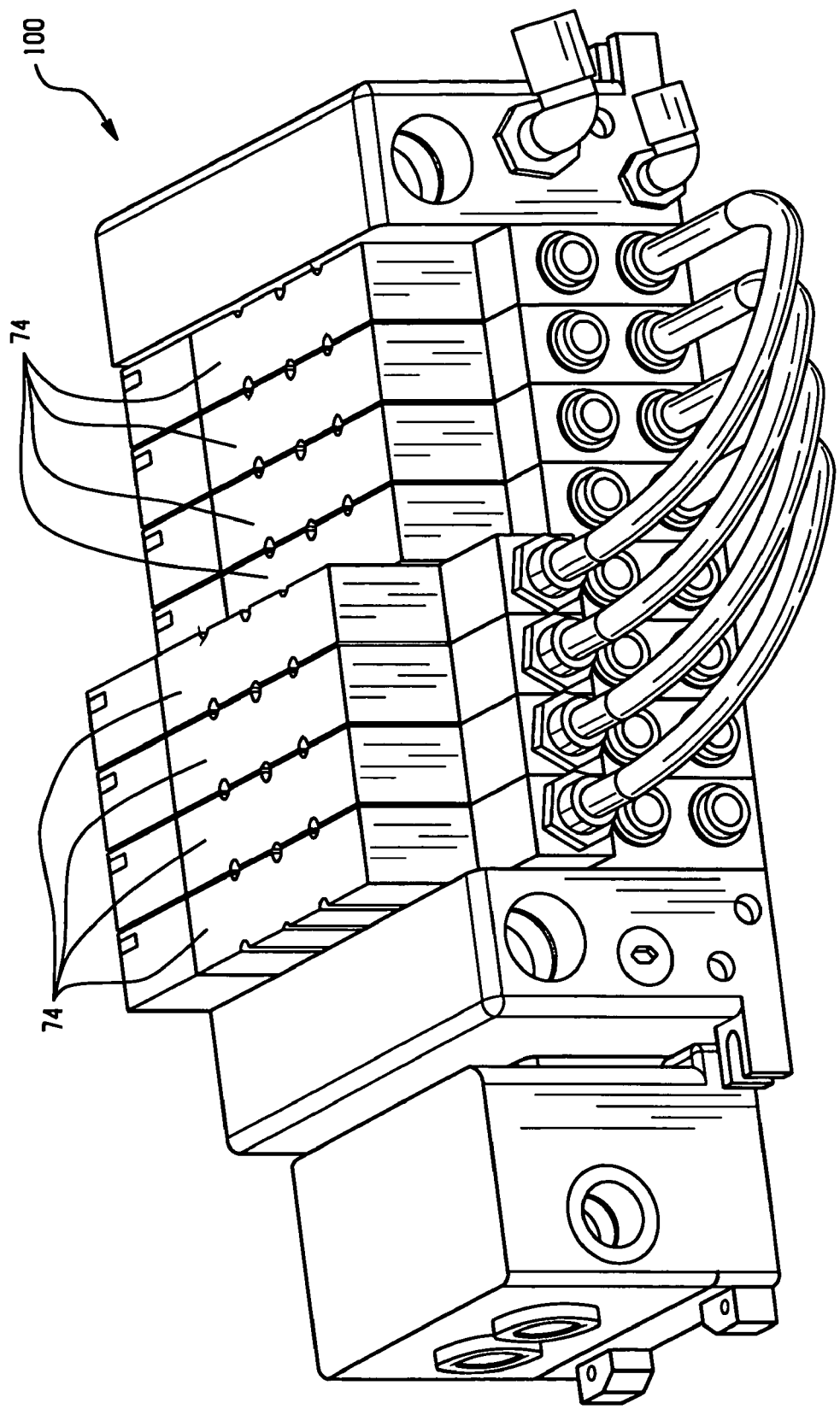
FIG. 7 is a perspective view of an embodiment of a flow control device for use in the control system of FIG. 4.

Referring now to FIG. 7, a manifold 100 is shown for providing the first control valve 72 and the second control valve 74 for multiple cylinders 38 (e.g., with each cylinder 38 dedicated to move a respective pair of arms 28 and 28' as described above). A suitable exemplary manifold 100 is an eight station air manifold available from SMC Pneumatic, Inc. located at Indianapolis, Ind.

By providing control system 60, relatively quiet machine 10 operation can be realized. In some embodiments, the carton filling apparatus 10 may operate at a noise level of less than about 80 dB, such as at about 78 dB. Noise level can be measured using a M-27 Noise Logging Dosimeter, available from Quest Technologies Inc., that is spaced horizontally from the apparatus 10 one meter and is placed one meter off of the ground with the apparatus 10 at its operating location.

A number of detailed embodiments have been described. Nevertheless, it will be understood that various modifications may be made. Accordingly, other embodiments are within the scope of the following claims.

What is claimed is:

1. A method for moving an actuator rod that is operatively connected to opposing sealing jaws of a top sealer, for forming a top seal on a carton being conveyed along a processing path on a form, fill and seal packaging machine, the carton including top fin panels configured for sealing to one another to form a top seal, the method comprising the steps of:

(a) actuating a first control valve from a first position to a second position that provides communication between a first pressurized pneumatic fluid source and a first port of an actuator having a movable actuator rod;

(b) actuating a second control valve from a first position to a second position that stops the escape of pneumatic fluid from the actuator through a second port of the actuator;

(c) moving the actuator rod toward a first position in response to passing of pressurized pneumatic fluid through the first port of the actuator, the actuator rod operatively connected to the sealing jaws to move the sealing jaws in a clamping direction while the actuator rod moves toward the first position; and (d) slowing the movement of the actuator rod toward the first position in response to the actuating of the second control valve in the second position, to slow the movement of the sealing jaws in the clamping direction.

2. The method of claim 1 further comprising the step (e) of actuating the second control valve back to the first position that provides escape of the pneumatic fluid from the actuator through the second port, to allow the sealing jaws to move to a fully clamped position after step (b).

3. The method of claim 2 further comprising the step (f) of actuating the first control valve back to the first position that provides escape of pressurized pneumatic fluid from the actuator through the first port after step (e).

4. The method of claim 3, wherein the step (f) further comprises providing communication between a second pressurized pneumatic fluid source and the second port of the actuator such that the actuator rod moves toward a second position opposite the first position, the actuator rod operatively connected to the sealing jaws to move the sealing jaws in an opening direction while the actuator rod moves toward the second position.

5. The method of claim 4, wherein the second pressurized fluid source delivers pneumatic fluid at a pressure less than that delivered by the first pressurized fluid source.

6. The method of claim 4, wherein the step (f) further comprises restricting escape of pressurized pneumatic fluid from the first port using a flow control valve including a restriction.

7. The method of claim 1, wherein the actuator is a linear actuator comprising a pneumatic cylinder including the actuator rod that moves between the first position and the second position, the first port being an extend port in communication with an extend chamber of the cylinder and the second port being a retract port in communication with a retract chamber of the cylinder.

8. In a carton filling apparatus, a system for forming a top seal on a carton being conveyed along a processing path of the carton filling apparatus, the system comprising:

a top sealer including opposing sealing jaws; and
a control system comprising:
    an actuator comprising an actuator rod operatively connected to the sealing jaws for opening and closing the sealing jaws to receive and seal the carton;
    a first pressurized fluid source for delivering pressurized pneumatic fluid to the actuator;
    a first control valve for use in controlling the delivery of the pressurized pneumatic fluid to the actuator from the first pressurized pneumatic fluid source; and
    a second control valve for use in controlling escape of pressurized pneumatic fluid from the actuator;
wherein the control system performs the following steps:
    (a) actuates the first control valve from a first position to a second position that provides communication between the first pressurized pneumatic fluid source and a first port of the actuator, for moving the actuator rod toward a first position, the actuator rod operatively connected to the sealing jaws to move the sealing jaws in a clamping direction while the actuator rod moves toward the first position; and
    (b) actuates the second control valve from a first position to a second position that stops the escape of pneumatic fluid from the actuator through a second port of the actuator, whereby the movement of the actuator rod toward the first position is slowed, and the movement of the sealing jaws in the clamping direction is slowed.

9. The system of claim 8, wherein the control system further performs the following steps:
    (c) actuates, after step (b), the second control valve back to the first position that provides escape of the pneumatic fluid from the actuator through the second port, to allow the sealing jaws to move to a fully clamped position.

10. The system of claim 9, wherein the control system further performs the following steps:
    (d) actuates, after step (c), the first control valve back to the first position that provides escape of the pneumatic fluid from the actuator through the first port.

11. The system of claim 10, wherein, with the first control valve actuated so that the pneumatic fluid escapes from the actuator through the first port, the control system further provides the following step:
    (e) provides communication between a second pressurized pneumatic fluid source and the second port of the actuator, such that the actuator rod moves toward a second position opposite the first position, the actuator rod being operatively connected to the sealing jaws to move the sealing jaws in an opening direction while the actuator rod moves toward the second position.

12. The system of claim 11, wherein the second pressurized pneumatic fluid source delivers fluid at a pressure less than that delivered by the first pressurized pneumatic fluid source.

13. The system of claim 11 further comprising a flow control valve comprising a restriction restricting escape of pressurized pneumatic fluid from the first port with the first control valve actuated back to the first position, so that pneumatic fluid escapes from the actuator through the first port.

14. The method of claim 8, wherein the actuator is a linear actuator comprising a pneumatic cylinder including an output rod that moves between the first position and an opposite, second position, the first port being an extend port in communication with an extend chamber of the cylinder and the second port being a retract port in communication with a retract chamber of the cylinder.

15. A method for moving an actuator rod that is operatively connected to opposing sealing jaws of a top sealer, for forming a top seal on a carton being conveyed along a processing path on a form, fill and seal packaging machine, the carton including top fin panels configured for sealing to one another to form a top seal, the method comprising the steps of:
    (a) providing a pneumatic cylinder comprising a cylinder and a piston, the piston movable within the cylinder to define an extend chamber and a retract chamber, and the piston comprising a rod that extends from the pneumatic cylinder in response to movement of the piston;
    (b) pressurizing the extend chamber of the pneumatic cylinder to a first pressure;
    (c) stopping the escape of pneumatic fluid from the retract chamber;
    (d) moving the piston and rod toward a first position in response to step (b);
    (e) allowing the pressure in the retract chamber to increase in response to movement of the piston and rod toward the first position, thereby slowing the movement of the piston and rod toward the first position; and
    (f) exhausting the pressurized pneumatic fluid within the retract chamber to cause the piston and rod to extend fully to the first position, thereby causing the sealing jaws to move to a clamped position.

16. The method of claim 15 further comprising the step (g) pressurizing the retract chamber of the pneumatic cylinder to a second pressure, while restricting escape of pressurized pneumatic fluid from the first port using a flow control value having a restriction, and (h) exhausting pressurized pneumatic fluid from the extend chamber, whereby the actuator rod moves toward a second position opposite the first position, and the sealing jaws move in an opening direction while the actuator rod moves toward the second position.

17. The method of claim 15 wherein the step (b) comprises Stopping the escape of pneumatic fluid from the retract chamber.

18. A method for moving an actuator rod that is operatively connected to opposing sealing jaws of a top sealer, for forming a top seal on a carton being conveyed along a processing path on a form, fill and seal packaging machine, the carton including top fin panels configured for sealing to one another to form a top seal, the method comprising the steps of:
  (a) actuating a first control valve from a first position to a second position that provides communication between a first pressurized pneumatic fluid source and a first port of an actuator having a movable actuator rod;
  (b) actuating a second control valve from a first position to a second position that inhibits the escape of pneumatic fluid from the actuator through a second port of the actuator;
  (c) moving the actuator rod toward a first position in response to passing of pressurized pneumatic fluid through the first port of the actuator, the actuator rod operatively connected to the sealing jaws to move the sealing jaws in a clamping direction while the actuator rod moves toward the first position;
  (d) slowing the movement of the actuator rod toward the first position in response to the actuating of the second control valve in the second position, to slow the movement of the sealing jaws in the clamping direction; and
  (e) actuating the second control valve back to the first position that provides escape of the pneumatic fluid from the actuator through the second port, to allow the sealing jaws to move to a fully clamped position after step (b).

19. The method of claim 18, wherein the second position of the second control valve stops the pneumatic fluid escape from the actuator through the second port.

20. The method of claim 18 further comprising the step (f) of actuating the first control valve back to the first position that provides escape of pressurized pneumatic fluid from the actuator through the first port after step (e).

21. The method of claim 20, wherein the step (f) further comprises providing communication between a second pressurized pneumatic fluid source and the second port of the actuator such that the actuator rod moves toward a second position opposite the first position, the actuator rod operatively connected to the sealing jaws to move the sealing jaws in an opening direction while the actuator rod moves toward the second position.

22. The method of claim 21, wherein the second pressurized fluid source delivers pneumatic fluid at a pressure less than that delivered by the first pressurized fluid source.

23. The method of claim 22, wherein the step (f) further comprises restricting escape of pressurized pneumatic fluid from the first port using a flow control valve including a restriction.

24. The method of claim 18, wherein the actuator is a linear actuator comprising a pneumatic cylinder including the actuator rod that moves between the first position and the second position, the first port being an extend port in communication with an extend chamber of the cylinder and the second port being a retract port in communication with a retract chamber of the cylinder.

* * * * *

UNITED STATES PATENT AND TRADEMARK OFFICE
CERTIFICATE OF CORRECTION

| | | |
|---|---|---|
| PATENT NO. | : 7,392,639 B2 | Page 1 of 1 |
| APPLICATION NO. | : 11/302841 | |
| DATED | : November 4, 2008 | |
| INVENTOR(S) | : Cletus Emerich Kreher et al. | |

It is certified that error appears in the above-identified patent and that said Letters Patent is hereby corrected as shown below:

Col. 7

Claim 16, line 1, delete "value" and insert --valve--

Claim 17, line 2, delete "Stopping" and insert --stopping--

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,392,639 B2 | Page 1 of 1 |
| APPLICATION NO. | : 11/302841 | |
| DATED | : November 4, 2008 | |
| INVENTOR(S) | : Cletus Emerich Kreher et al. | |

It is certified that error appears in the above-identified patent and that said Letters Patent is hereby corrected as shown below:

Col. 7

Claim 16, line 1, delete "value" and insert --valve--

Claim 17, line 8, delete "Stopping" and insert --stopping--

This certificate supersedes the Certificate of Correction issued May 5, 2009.

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,392,639 B2
APPLICATION NO. : 11/302841
DATED                  : July 1, 2008
INVENTOR(S)         : Cletus Emerich Kreher et al.

Page 1 of 1

It is certified that error appears in the above-identified patent and that said Letters Patent is hereby corrected as shown below:

Col. 7

Claim 16, line 1, delete "value" and insert --valve--

Claim 17, line 8, delete "Stopping" and insert --stopping--

This certificate supersedes the Certificates of Correction issued May 5, 2009 and May 26, 2009.

Signed and Sealed this

Sixteenth Day of June, 2009

JOHN DOLL
*Acting Director of the United States Patent and Trademark Office*